United States Patent Office

2,713,596
Patented July 19, 1955

2,713,596

N-BROMODICHLOROACETAMIDE

Joseph D. Park and John R. Lacher, Boulder, Colo., and Henry J. Gerjovich, Wilmington, Del., assignors to Arapahoe Chemicals, Inc., Boulder, Colo., a corporation of Colorado No Drawing. Original application October 2, 1951, Serial No. 249,388. Divided and this application December 28, 1953, Serial No. 412,958

1 Claim. (Cl. 260—561)

This invention relates to a novel brominating agent, namely N-bromodichloroacetamide.

Objects and advantages of the invention will be set forth in part hereinafter and in part will be obvious herefrom, or may be learned by practice with the invention, the same being realized and attained by means of the compound pointed out in the appended claim.

An object of this invention is to prepare a novel brominating agent which can be utilized in a variety of chemical reactions.

Our novel brominating agent, N-bromodichloroacetamide, may be prepared by reacting dichloroacetamide with bromine and silver oxide in the presence of a perfluorinated aliphatic carboxylic acid, such as trifluoroacetic acid, as a solvent.

In order to illustrate the invention more clearly, the following example is given.

EXAMPLE

To a solution of 0.1 mole of silver oxide in 250 ml. of anhydrous trifluoroacetic acid, was added 0.2 mole of dichloroacetamide. The reaction mixture was stirred at room temperature for one hour, and then a solution of 0.2 mole of bromine dissolved in 100 ml. of trifluoroacetic acid was added dropwise through a dropping funnel. Stirring was maintained during the addition of bromine and for an additional half-hour. The silver bromide which formed was filtered off on a sintered-glass disc and washed well with trifluoroacetic acid. The trifluoroacetic acid was removed by distillation at room temperature at 20 mm. pressure. After approximately three-quarters of the trifluoroacetic acid had been distilled off, a considerable amount of crystalline material separated out of the solution. The distillation was discontinued and the solid was filtered off and washed twice with cold trifluoroacetic acid. After evacuating the solid for one hour at room temperature under 1 mm. pressure, 29 g. (60% of the theoretical amount) of N-bromodichloroacetamide was obtained. The N-bromodichloroacetamide obtained in a 76% yield had a melting point of 96° C.

Our novel compound possesses unique brominating properties heretofore unknown and unpredictable on the basis of the prior art. These properties will become evident from the studies described below relating to the brominating action of N-bromomonochloroacetamide, N-bromodichloroacetamide and N-bromotrichloroacetamide. Thus, a study of the brominating properties of these compounds with cyclohexene demonstrates the enhanced "positive" character of the bromine atom. In this study it was observed that cyclohexene reacts with N-bromotrichloroacetamide (Equation 1) to yield predominantly N-(2-bromocyclohexyl)-trichloroacetamide; with N-bromodichloroacetamide (Equation 2) the product is largely 3-bromocyclohexene; with N-bromomonochloroacetamide (Equation 3) the product is predominantly 1,2-dibromocyclohexane. In contrast with these results, is the bromination of cyclohexene with N-bromoacetamide (Equation 4), where a 3-bromocyclohexene was obtained.

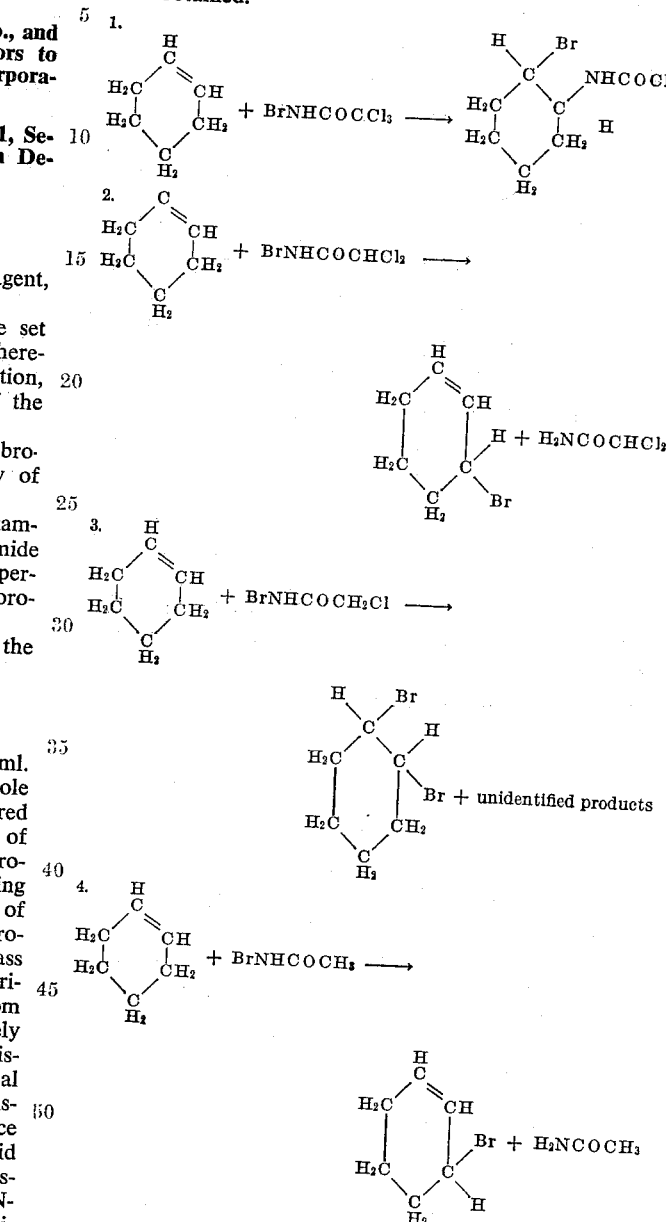

It will be noted that the N-bromomonochloroacetamide, N-bromodichloroacetamide and N-bromotrichloroacetamide give three different products in their reaction with cyclohexene. This result is entirely unexpected in view of the prior art. Even more unexpected is the result that of the N-bromochloroacetamides, it was the dichlorosubstituted acetamide which produced the same product as did the unsubstituted acetamide. One would have predicted that a gradation of properties from unsubstituted N-bromoacetamide to monosubstituted to disubstituted to trisubstituted would be he case rather than the entirely discontinuous variation of properties which was observed.

The reaction of these same N-bromochloroacetamides with toluene likewise gives rise to an unusual order of reactivity. It should be emphasized, however, that the order of reactivity is not the same with toluene as was observed with cyclohexene. While all of the compounds react with toluene to produce monobrominated toluenes in yields of 50 to 72%, the constitution of the monobrominated toluenes is very different in each case.

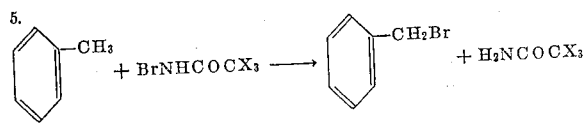

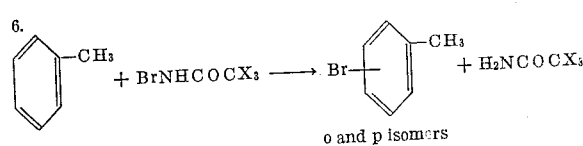

o and p isomers

It will be seen from the data presented in Table I that unsubstituted N-bromoacetamide produces a monobrominated toluene which is entirely the result of reaction with the side-chain (Equation 5), while the monosubstituted N-bromoacetamide produces almost entirely nuclear substitution (Equation 6). The di- and trisubstituted compounds produce both nuclear and side-chain bromination, with the trisubstituted N-bromoacetamide being most like the unsubstituted N-bromoacetamide.

*Table I*

BROMINATION OF TOLUENE AT 90-103° C.

| Compound | Percent Conversion to Monobromotoluenes | Type of Substitution | |
|---|---|---|---|
| | | Percent Nuclear | Percent Side-chain |
| N-bromoacetamide | 50 | 0 | 100 |
| N-bromomonochloroacetamide | 72 | 82 | 18 |
| N-bromodichloroacetamide | 64 | 64 | 36 |
| N-bromotrichloroacetamide | 58 | 17 | 83 |

From the above studies, it is evident that the chemical behavior of the N-bromodichloroacetamide compared to the N-bromomonochloroacetamide and N-bromotrichloroacetamide could not have been predicted on the basis of classical organic chemistry.

Our novel brominating agent may be utilized in various organic reactions as mild and specific oxidizing agents.

The invention in its broader aspects is not limited to the specific steps and compositions described but departures may be made therefrom within the scope of the accompanying claim without departing from the principles of the invention and without sacrificing its chief advantages.

This application is a divisional application of pending application Serial No. 249,388, filed October 2, 1951.

We claim:
N-bromodichloroacetamide.

References Cited in the file of this patent

Francesconi, "Gazz. Chim. Ital." vol. 33 (I) 1903, p. 228.

Parks et al., "J. Am. Chem. Soc." vol. 74 (1952) pp. 2189–93.

Lacher et al., "J. Am. Chem. Soc." vol. 74 (1952) pp. 5578–80.